US007376208B2

(12) United States Patent
Dominique et al.

(10) Patent No.: US 7,376,208 B2

(45) Date of Patent: May 20, 2008

(54) RECEPTION METHOD FOR PACKETIZED INFORMATION WITH AUTOMATIC REPEAT REQUEST

(75) Inventors: Francis Dominique, Rockaway, NJ (US); Hongwei Kong, Denville, NJ (US); Ashok Armen Tikku, Morristown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 672 days.

(21) Appl. No.: 10/844,803

(22) Filed: May 13, 2004

(65) Prior Publication Data

US 2005/0254603 A1 Nov. 17, 2005

(51) Int. Cl.
*H04L 27/06* (2006.01)

(52) U.S. Cl. ...................... 375/340; 375/238; 375/239; 375/242; 375/256; 375/257; 375/332; 375/348; 375/361; 375/370; 375/381

(58) Field of Classification Search ............... 375/340, 375/341, 746, 749
See application file for complete search history.

(56) References Cited

U.S. PATENT DOCUMENTS 7,206,280 B1 * 4/2007 Khan et al. ................ 370/216
7,269,420 B2 * 9/2007 Heo et al. ................... 455/436
2003/0110435 A1 6/2003 Wu et al. ................... 714/748
2003/0202500 A1 * 10/2003 Ha et al. .................... 370/342
2004/0141523 A1 * 7/2004 Bhushan et al. ............ 370/469
2004/0141525 A1 7/2004 Bhushan et al. ............ 370/473

FOREIGN PATENT DOCUMENTS

EP 1 357 695 10/2003

OTHER PUBLICATIONS

Anthony C. K. Soong, et al, "Forward High-Speed Wireless Packet Data Service in IS-2000—1xEV-DV", *IEEE Communications Magazine*, vol. 41, No. 8, (Aug. 2003), pp. 170-177.
European Search Report, Appl. No. 05252782.7-2415 PCT/, (Aug. 26, 2005).

* cited by examiner

*Primary Examiner*—Shuwang Liu
*Assistant Examiner*—Dhaval V Patel

(57) ABSTRACT

A decoding method is carried out in a receiver configured to accept format information relating to sequences of input data, to use format information in the decoding of each input sequence, and to issue an acknowledgement signal in the event that an input sequence is successfully decoded. The method involves receiving a format message pertaining to a new input sequence, searching a candidate set of format indices an index best satisfying a criterion for matching to the format message, and selecting the index giving the best match. Before searching, the receiver reads the acknowledgement signals issued in response to the decoding or attempted decoding of recent input sequences. If the acknowledgement signals satisfy an appropriate condition, the search is limited to fewer than all the indices in the candidate set. The format information that corresponds to the selected index is used in decoding the new input sequence.

10 Claims, 2 Drawing Sheets

RECEPTION METHOD FOR PACKETIZED INFORMATION WITH AUTOMATIC REPEAT REQUEST

FIELD OF THE INVENTION

This invention relates to packetized communication systems, and more particularly to communication on the reverse link of a wireless CDMA system exercising a Hybrid ARQ protocol.

ART BACKGROUND

It has long been recognized that the data throughput of a digital communication system may be limited by noise, interference, and at least in the wireless context, by the physical channel effects referred to as fading. To counter these effects, it is common practice to send data in coded form, such that redundant information in the code makes decoding possible even in the presence of some corrupted information. Certain of these codes are designed such that the receiver can check the detected and decoded data sequence using an operation referred to as a Cyclic Redundancy Check (CRC). If the CRC succeeds, the data sequence is deemed to have been received successfully.

In the context of packetized communications, there are known procedures according to which the receiver will request the retransmission of a corrupted packet. In at least some such procedures, information from both the original packet and the retransmitted packet is used for decoding.

In the context of wireless CDMA communication, a certain class of protocols for requesting retransmission of corrupted packets is referred to as Hybrid ARQ (Automatic Repeat Request), or HARQ. In accordance with the known techniques of HARQ, the receiver checks, exemplarily by executing a CRC, for successful decoding of the received data sequence. The receiver sends the transmitter a positive acknowledgement signal, referred to as ACK, in the event of sucessful decoding. Additionally or alternatively, the receiver sends a negative acknowledgement signal, referred to as NACK, in the event of unsuccessful decoding. The NACK, or alternatively the absence of an ACK at a designated time, prompts the transmitter to retransmit the corrupted packet.

Various alternative protocols are included in the broad category of HARQ techniques. One such protocol is Incremental Redundancy (IR). According to the IR protocol, each packetized sequence of bits to be transmitted is referred to as a "subpacket." If the first subpacket fails the CRC check, the receiver requests retransmission. The retransmitted subpacket is a new subpacket containing the same message information as the first subpacket, but also containing a greater number of redundant bits as an aid for decoding. Generally, at least one further subpacket is available for retransmission, containing even more redundant bits than the previous subpacket.

In the practice of the IR protocol at least on the reverse link of a CDMA system as described, e.g., in the CDMA2000 RevD standard, each subpacket is preceded or accompanied by a control signal which identifies the format of the subpacket. Format information is communicated in the form of an index, which if received correctly identifies a particular selection from a multiplicity of available formats. Knowledge of the format tells the receiver, among other things, what level of redundancy to expect in the particular subpacket that is to be received.

It will be appreciated that in order for the subpacket to be decoded correctly, it is important for the receiver to receive the format index correctly. One of the challenges in at least the field of CDMA has been to increase the reliability with which such control information is received. In particular, it would be advantageous to increase such reliability without allocating additional power to the control messages at the expense of system capacity.

SUMMARY OF THE INVENTION

The level of redundancy in a given subpacket is identified by an index called the SPID. The SPID is readily inferred from the format index that precedes or accompanies a transmitted subpacket. The subpacket having the least redundancy has SPID of 0, that having the next higher amount of redundancy has SPID of 1, etc. Typically, there are three levels of redundancy, having SPID values of 0, 1, and 2, respectively.

We have come to the realization that the following fact has important practical significance for the reliable reception of format indices: The recent history of ACK (or NACK) messages limits the possible values of the next SPID to be received. That is, if, e.g., the receiver acknowledged the last subpacket with an ACK, then, assuming that the acknowledgement message is understood correctly by the transmitter, the next SPID must have value 0 or NULL. (NULL signifies that no information was transmitted.) On the other hand, if the last two acknowledgement messages were ACK-NACK, in that order, then the next SPID must be 0, 1 or NULL. If the last three acknowledgement messages were ACK-NACK-NACK in that order, then the next SPID must be 0, 1, 2, or NULL.

The practical significance of the fact stated above is that in a receiver which attempts to match an as-received format index to one of the known candidate indices, the recent acknowledgement history can be used to limit the number of candidates which need to be considered. As a consequence, the reception of format indices can be made more reliable.

Accordingly, the invention in one embodiment is a method for processing a subpacket of received message information, in which the subpacket has one of a multiplicity of possible formats, the correct one of which must be known to a receiver in order for the receiver to successfully decode the subpacket. The method includes receiving a format index in addition to the message information, and matching the received format index to one from a multiplicity of known format indices. The matching step is carried out by searching for a best match over a search set of candidate indices. The method further includes counting expected subpackets that have been unsuccessfully decoded since the last successful decoding of a subpacket, and using the resulting count to limit the number of candidate indices included in the search set. A subpacket is "expected" if it is due in a given timeslot. A decoding attempt may be unsuccessful if, inter alia, a corrupted subpacket was received or if no subpacket was in fact transmitted.

The method further includes decoding the subpacket of received message information. The decoding is performed under the assumption that the format of the subpacket to be decoded has been indicated by the outcome of the matching step.

In specific embodiments of the invention, the subpacket is received by the base station of a CDMA system on a data channel, and the format index is received on a control channel distinct from the data channel.

DETAILED DESCRIPTION

The principles of the present invention apply generally to packetized communication in networks in which packets or the like can be subjected to requests for repeat transmission, and in which repeat transmissions of an original packet can include redundant bits not present in the original packet. Such networks may be, without limitation, optical, wireline, or wireless networks.

For purposes of illustration, we will hereinbelow describe an embodiment of the invention in a wireless CDMA network, in the context of reverse link, or "uplink" transmission of data packets from a mobile station to a base station. Various protocols to be mentioned below are associated with the standard CDMA2000 RevD. Consonant with the nomenclature adopted there, we use the term "subpacket" to mean a packetized data sequence that is subject to retransmission with a different number of redundant bits, or a packetized data sequence that is the result of such retransmission.

Figure 1:
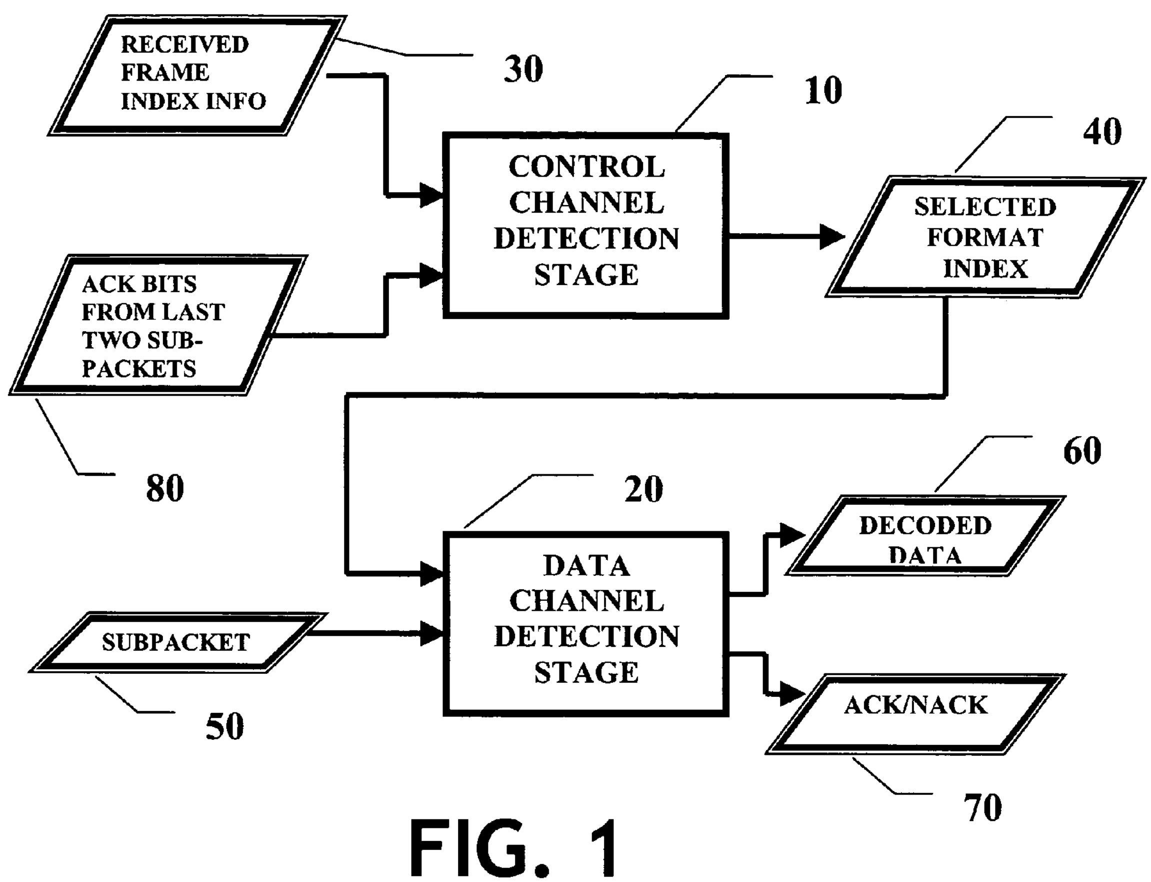
FIG. 1 is a functional block diagram of a CDMA base-station receiver adapted to implement the present invention in an illustrative embodiment.

With reference to FIG. 1, one receiver which is of interest for use on a CDMA2000 base station includes a control-channel detection stage 10 and a data-channel detection stage 20. Control information is sent on the reverse link on a control channel which is, in general, distinct from the data channel on which user information is sent. The control information includes a sequence of bits, e.g. six bits in CDMA2000, which indexes one of a multiplicity of possible formats for a corresponding subpacket, or "frame." We refer to such an index as a "format index." A format index is indicated in FIG. 1 by the reference numeral 30 and the associated box labeled "Received Frame Index Information." An exemplary set of possible frame indices will be described below.

The format index may arrive from the base station in a corrupted form. The format index on arrival, i.e. prior to any data recovery or error correction, will be referred to herein as the "measured index signal." It is a role of detection stage 10 to match the measured index signal to one selection from the multiplicity of candidate format indices. This is done, for example, by a posteriori maximum likelihood detection: Find that candidate index x which maximizes the value of $\Pr(x|y)$, wherein y is the measured index signal, and the above mathematical expression is read "the probability of x given y." The index selected by detection stage 10 is indicated in FIG. 1 by reference numeral 40 and the box labeled "Selected Format Index."

It will be appreciated that for user data to be reliably decoded at the base station, the selected frame indices must reliably match those that are sent out by the mobile station. To improve reliability, the frame index information can also be made subject to retransmission requests. This, however, increases the complexity and therefore the cost of the receiver at the base station. Another way to improve reliability is to increase the transmission power of the frame index information. In general, however, an increase in power for the control channel is achieved at the expense of power for the data channel, and tends to decrease the throughput on the data channel. One advantage of the present invention is that it makes the frame index information more reliable without needing to retransmit that information and without reallocating transmission power between the data channel and the control channel.

Turning again to FIG. 1, it will be seen that selected index 40 is provided as input to detection stage 20. Also input to detection stage 20 is current subpacket 50, which is received on the data channel. It is a role of detection stage 20 to recover decoded data 60 from subpacket 50. In order to apply the appropriate algorithm for decoding subpacket 50, detection stage 20 needs to know the format of the subpacket, including the degree of redundancy as well as, in CDMA2000, the data transmission rate and the presence or absence of a power boost. All such format information is conveyed by selected index 40.

One of the functions performed by detection stage 20 is a CRC check, which is performed on the decoded subpacket to detect whether there are errors in the recovered data. If the CRC check succeeds, i.e., detects no error, detection stage 20 will in some versions issue an ACK message, which is sent to the transmitting mobile station to indicate that the subpacket has been successfully received. If the CRC check fails, i.e., detects error, detection stage 20 will in some versions issue a NACK message, which indicates to the transmitting base station that the last-transmitted subpacket was not successfully received. In some versions of the receiver, only one acknowledgement signal 70—either an ACK or a NACK, is sent. In the first instance, NACK is inferred from the absence of ACK in a given frame. In the other instance, ACK is inferred from the absence of NACK in a given frame.

In accordance with the HARQ-IR protocol described above, the mobile station may respond to a NACK, actual or inferred, with a retransmitted subpacket. The mobile station will retransmit up to a specified number of subpackets. In CDMA2000, this number is two. That is, a given block of data will result in at most three subpackets: the original and two retransmitted subpackets. In the event of further NACK signals, the subpacket will be deemed irrecoverable.

In the event that a retransmitted subpacket is received, detection stage 20 will look back to prior subpackets, and will use information from the original subpacket and information from any intervening subpacket, in decoding the present subpacket.

As noted, there is a multiplicity of possible formats for each subpacket, each such format having its own format index. Table 1 lists the formats available in CDMA2000. As will be seen from the table, there is a total of 57 formats, with respective indices 0-29 and 32-58. The indices 30, 31, and 59-63 are reserved. It will be seen that the table is divided into three columns, each corresponding to a different SPID. SPID 00 denotes an original subpacket, typically having the least degree of redundancy. SPID 01 denotes a first retransmitted subpacket, typically having an intermediate level of redundancy. SPID 02 denotes a second retransmitted subpacket, typically having the highest level of redundancy.

Within each column of the table, there are ten formats for which there is no power boost, and nine for which there is power boost. Each of these formats is characterized by a data transmission rate, which ranges from 19.2 kbps to 1.3 Mbps. The data transmission rate is indicated by a parameter referred to as the SDU size.

The SPID information, including the specification of the data transmission rate, is transmitted concurrently with the subpacket on time aligned control and data channels, respectively.

It should be noted in this regard that the transmitted format information typically incoudes five bits for the format index, one bit for the boost indicator, and a seventh bit, referred to as the MSIB, to indicate whether the current data rate is acceptable to the mobile station. The MSIB is typically communicated by flipping (or not flipping) the other six bits. Flipping these bits does not cause ambiguity because it is done in the context of a block code large enough to resolve any possible ambiguity.

It should also be noted that the null hypothesis (indicated as "NULL" at the bottom of each column of Table 1) is a further candidate control channel message, in addition to those described above. Under the null hypothesis, the mobile station is not transmitting any information on the control (or data) channel.

Conventionally, detection stage 10 of the receiver of FIG. 1 searches over all 57 indices to find the best match to the measured index signal. However, certain indices can be eliminated as candidate indices, and thus the search can be narrowed, if recent acknowledgement signals are taken into account. Narrowing the search in this manner reduces the probability of error in recovering the correct format index from the measured index signal.

Consider, for example, a receiver that issues only positive acknowledgement (ACK) signals and leaves negative acknowledgements (NACKs) to be inferred. If the last subpacket, i.e., the subpacket just prior to the current one, was acknowledged, then the current subpacket (if present) can be assumed to be an original transmission of a new block of data. In that case, the receiver needs to search only over the column of Table 1 headed "SPID 00." The search should include NULL as one of the candidates.

If the last two subpackets were acknowledged and not-acknowledged, in that order, then the current subpacket (if present) may be an original transmission or first retransmission. In particular, it may be an original transmission if no subpacket was transmitted in the last timeslot. In any event, the occurrence of only one non-acknowledgement since the last ACK eliminates the possibility that the current packet is a second retransmission. Therefore, the receiver needs to search only over the column of Table 1 headed "SPID 00" and the column headed "SPID 01."

If neither of the last two subpackets was acknowledged, then the current subpacket (if present) may be an original transmission, a first retransmission, or a second retransmission. In that case, the receiver needs to search all three columns of Table 1.

Turning back to FIG. 1, it will be seen that the acknowledgement bits from the previous two sub-packets, as indicated by reference numeral 80, are provided as input data to detection stage 10.

The detection process in detection stage 10 will now be described in more detail with reference to FIG. 2. As seen at block 90, the detector reads the measured index signal and also reads the acknowledgement information issued by detection stage 20 in response to the two subpackets just prior to the current subpacket. At decision block 100, control is directed to search block 130 in the event that the prior subpacket nearest in time was acknowledged. In this case, as indicated at block 130, the search is limited to those formats for which the SPID is 00. As indicated at data block 120, this search takes the measured index signal as input data.

Turning back to decision block 100, if the prior subpacket nearest in time was not acknowledged, then control is directed to further decision block 110. If the prior subpacket next nearest in time (i.e., the earlier of the two prior subpackets) was acknowledged, control is directed to search block 140, where the search is limited to those formats for which the SPID is 00 or 01. If the prior subpacket next nearest in time was not acknowledged, control is directed to search block 150, where the search is conducted over all formats. Measured index signal 120 is taken as input data by search blocks 140 and 150.

Figure 2:
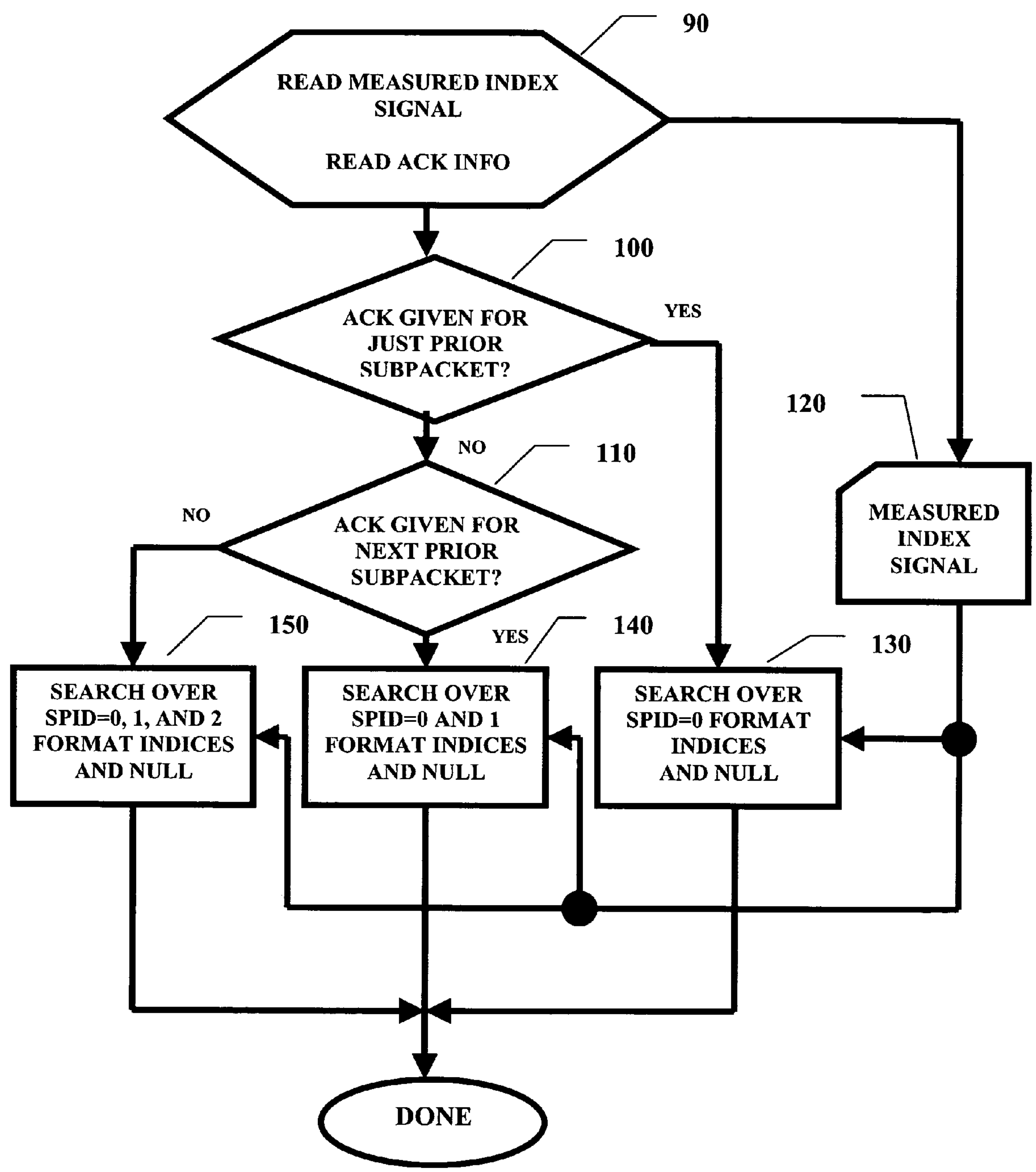
FIG. 2 is a flow chart of an illustrative detection process as implemented, for example, in the receiver of FIG. 1.

The process of FIG. 2 is readily extended to cases in which three, four, or more retransmissions are permitted. For example, the flowchart of FIG. 2 is readily modified by adding an additional decision block and an additional search block for each further retransmission that is permitted.

In general, when the maximum number of permitted retransmissions is $N_{MAX}$, the search set can be partitioned into $N_{MAX}+1$ subsets which contain, respectively, format indices for original transmissions (N=0) and format indices for N'th retransmissions, N=1, . . . , $N_{MAX}$. Each search for a matching format index can be limited to those subsets for which N is at most the number of failed decoding attempts since the last successful decoding attempt.

Although the base station in the example provided above issues only ACK signals and leaves NACKSs to be inferred, it will be clear that similar principles apply when, conversely, NACK signals are issued and ACKs are inferred.

The process of FIG. 2 is readily extended to provide sequence detection. In sequence detection, the last one, two, or more control messages are estimated jointly with the current message as a sequence of control messages. This gives the advantage of longer data sequences over which to perform maximum likelihood estimation.

Consider, for example, a sequence of depth 2, consisting of the last message and the current message. If there was a successful decoding attempt just prior to the last control message, the search space for the last message is limited to the first column of Table 1, and the search space for the current message is limited to no more than the first two columns. In fact, the search space for the current message is much more severely limited, because a re-transmission must keep the same SDU size (which indicates the data transmission rate) and boost indicator as the previous transmission. Therefore, the search set for the complete sequence is the union of two sets: {those sequences in which the first entry is NULL and the second entry is from the first column of Table 1} ∪{those sequences in which the first entry is from the first column of the table and the second entry is in the second column of the table but on the same line as the first entry}.

Those skilled in the art will appreciate that the principles of sequence searching illustrated above in regard to sequences of depth 2 are readily extended to sequences of arbitrarily greater depth.

TABLE 1

| SPID 00 | | | SPID 01 | | | SPID 02 | | |
|---|---|---|---|---|---|---|---|---|
| BOOST INDIC. | SDU SIZE | F.I. | BOOST INDIC. | SDU SIZE | F.I. | BOOST INDIC. | SDU SIZE | F.I. |
| FALSE | 174 | 0 | FALSE | 174 | 10 | FALSE | 174 | 20 |
| | 386 | 1 | | 386 | 11 | | 386 | 21 |
| | 770 | 2 | | 770 | 12 | | 770 | 22 |
| | 1538 | 3 | | 1538 | 13 | | 1538 | 23 |
| | 3074 | 4 | | 3074 | 14 | | 3074 | 24 |
| | 4610 | 5 | | 4610 | 15 | | 4610 | 25 |
| | 6146 | 6 | | 6146 | 16 | | 6146 | 26 |
| | 9218 | 7 | | 9218 | 17 | | 9218 | 27 |
| | 12290 | 8 | | 12290 | 18 | | 12290 | 28 |
| | 15362 | 9 | | 15362 | 19 | | 15362 | 29 |
| TRUE | 174 | 32 | TRUE | 174 | 41 | TRUE | 174 | 50 |
| | 386 | 33 | | 386 | 42 | | 386 | 51 |
| | 770 | 34 | | 770 | 43 | | 770 | 52 |
| | 1538 | 35 | | 1538 | 44 | | 1538 | 53 |
| | 3074 | 36 | | 3074 | 45 | | 3074 | 54 |
| | 4610 | 37 | | 4610 | 46 | | 4610 | 55 |
| | 6146 | 38 | | 6146 | 47 | | 6146 | 56 |
| | 9218 | 39 | | 9218 | 48 | | 9218 | 57 |
| | 12290 | 40 | | 12290 | 49 | | 12290 | 58 |
| | NULL | | | NULL | | | NULL | |

What is claimed is:

1. A decoding method carried out in a receiver configured to accept format information relating to sequences of input data, and to use format information in the attempted decoding of each input sequence, and to issue a positive acknowledgement signal in the event that an input sequence expected in a given timeslot is received and successfully decoded, or to issue a negative acknowledgement signal in the event of failure to decode an expected sequence, or to issue acknowledgement signals of both said types, the method comprising:

receiving previous acknowledgement signals issued in response to decoding or attempted decoding of recent expected input sequences;

receiving a current format message which pertains to a current input sequence;

searching a search set of candidate format indices for an index which best matches the format message according to a matching criterion, and selecting said index;

before the searching step, reading the previous acknowledgement signals that were issued in response to the decoding or attempted decoding of the most recent two or more expected input sequences, and when said previous acknowledgement signals satisfy an appropriate condition, determining a level of redundancy of the current input sequence based on the acknowledgment signals of last two or more input sequences, and limiting the search to fewer than all the indices in the candidate set, based on the determined level of redundancy; and decoding the current input sequence using the format information that corresponds to the selected index.

2. The method of claim 1, wherein: the search set is partitioned into $N_{MAX}+1$ subsets containing, respectively, indices for original transmissions, and indices for N'th retransmissions, N=1, . . . , $N_{MAX}$, wherein N=0 will here denote an original transmission and $N_{MAX}$ is an integer greater than N; and the step of decoding the current input sequence is carried out using the last N received input sequences.

3. The method of claim 2, wherein: the method further comprises counting a number of failed attempts to decode an expected sequence that have occurred since a last successful decoding attempt; and the search for a matching format index is limited to those subsets for which N is less than or equal to said number of failed attempts.

4. The method of claim 3, wherein, irrespective of the number of failed attempts, the search for a matching format index includes NULL as a possible outcome, wherein NULL signifies that no format index was transmitted.

5. The method of claim 4, wherein: $N_{MAX}2$;

when the last input sequence was successfully decoded, the search is carried out only over NULL and indices for original transmissions;

when the number of failed attempts is 1, the search is carried out only over NULL, indices for original transmissions, and indices for first retransmissions; and when the number of failed attempts is 2, the search is carried out over NULL, indices for original transmissions, and indices for first and second retransmissions.

6. The method of claim 1, wherein, the search is carried out by a posteriori maximum likelihood detection.

7. The method of claim 1, wherein the receiver is situated in a base station of a wireless communication system.

8. The method of claim 7, wherein the receiver receives the format information on a control channel of the wireless system and the receiver receives the input sequence on a data channel of the wireless system which is distinct from the control channel.

9. The method of claim 1, wherein the search for a matching format index is carried out over sequences of two or more format indices to be matched to a sequence consisting of a last one or more format messages and the current format message.

10. The method of claim 9, wherein the search for a matching format index is limited by requiring that any retransmission must have the same data transmission rate as a preceding transmission, and must have power boost if and only if a preceding transmission had power boost.

* * * * *